United States Patent [19]

Colton et al.

[11] Patent Number: 4,922,977
[45] Date of Patent: May 8, 1990

[54] ROTARY CUTTER HEADS

[75] Inventors: Peter Colton, Melton Mowbray; Andrew D. Willbond; Mark A. Stocker, both of Leicester, all of United Kingdom

[73] Assignee: Wadkin plc, Leicester, United Kingdom

[21] Appl. No.: 346,175

[22] PCT Filed: Oct. 6, 1986

[86] PCT No.: PCT/GB86/00602
§ 371 Date: Apr. 6, 1989
§ 102(e) Date: Apr. 6, 1989

[87] PCT Pub. No.: WO88/02292
PCT Pub. Date: Apr. 7, 1988

[30] Foreign Application Priority Data

Oct. 6, 1986 [DK] Denmark ............................. 3029/88

[51] Int. Cl.[5] .............................................. B27G 13/00
[52] U.S. Cl. .................................... 144/230; 144/174; 407/41; 407/49
[58] Field of Search ....................... 409/234, 236, 241; 407/41, 49; 144/117 R, 230, 174

[56] References Cited

U.S. PATENT DOCUMENTS 4,220,186  9/1980  Sybertz ........................... 144/174
4,594,928  6/1986  Thomas et al. ................. 144/230

Primary Examiner—W. Donald Bray
Attorney, Agent, or Firm—Chilton, Alix & Van Kirk

[57] ABSTRACT

In a rotary cutter block each blade (14) is clamped in an inwardly divergent recess (12) by a wedge (16). The wedges (16) may be clamped simultaneously against their associated blades (14) by application of high pressure grease at any of one or more grease nipples (52, 54) which actuates by hydraulic plungers (22) in the bases of the wedge recesses (12). The angle of the wedges (16) is such as to provide a taper-lock between the wedges (16), the blades (14) and the recesses (12), which means that after depressurization the cutterblock can be stored or moved from one machine spindle to another without slackening of the wedges. The invention is of considerable advantage in reducing the amount of setting-up time involved in setting and grinding the blades of a rotary cutter head, since one pressurization is sufficient to tighten all the wedges simultaneously and to the same degree.

9 Claims, 3 Drawing Sheets

ROTARY CUTTER HEADS

TECHNICAL FIELD

This invention relates to rotary cutter heads for woodworking machinery and in particular to a novel means of blade anchorage and adjustment for such cutter heads.

BACKGROUND ART

Rotary cutters for woodworking machinery may be of one-piece construction or may be provided with removable and adjustable cutter blades. The latter form of rotary cutter is advantageous in that worn or broken blades may be replaced, and moreover the blades may be adjusted radially outwardly in blade-receiving recesses or housings in a cutter block, to compensate for blade wear. For many years the retention of such blades by wedge means has been known, with each blade and its associated wedge being received in an inwardly divergent blade-receiving recess in the cutter block. Tightening screws or bolts are provided, bearing on a side face of the wedge means, for securing the blades and wedges in position in the recesses. The wedging action is such that with increasing rotational speeds the wedges are urged outwardly by centripetal force, to bear with increasing force on the blades received in the same blade-receiving recesses. In accordance with some known cutterblock constructions, when the wedges are slackened in the blade-receiving recesses by the partial release of the tightening screws or bolts, the blades must be withdrawn axially from the block and reinserted axially in their new radially outer positions. This can be a time-consuming operation, since the wedges become loose when the blades are removed, and tend to interfere with the reinsertion of the blades. Our European Patent No. 73595 therefore proposes a modified construction in which at least one resilient means extends partially from a recess in the wedge means on slackening of the tightening screws of bolts, to hold the blade lightly in position while the screws or bolts are in their untightened condition.

A common disadvantage of the above known methods of blade mounting is the number of tightening screws or bolts to be tightened or slackened for each blade adjustment. For a cutterblock with six angularly spaded blades there may be up to seven tightening screws or bolts per blade, which means up to 42 screws or bolts to be slackened and re-tightened each blade setting or regrinding operation. This takes time and also incurs the risk that if the operator is distracted during the sequence of tightening operations, then some bolts or screws may remain slack. This is a safety hazard. Even with axially shorter cutterblocks in which there are only one or two tightening screws or bolts per wedge, the known methods of tightening the wedges incur the risk that overtightening may distort the cutterblock body. The use of a torque wrench is recommended to overcome the overtightening problem, but there is no protection against someone damaging the cutterblock body by ignoring the recommendations and overtightening.

DE 1170607B (Continental Gummi Werke) discloses a rotary cutter head with a blade 4 held in place by a wedge 3. The wedge 3 is driven outwardly in its wedging recess and into contact with the blade 4 by pressurization of a flexible and inflatable hose 2 located axially of the cutter-block 1. Because the hose 2 occupies a position axially of the cutterblock 1, there is no provision for clamping the cutterblock on an axial spindle of a rotary woodworking machine. The cutter head would therefore be end-mounted by bolts.

US 2652749 (Hagmeister) also discloses a rotary cutter head in which blades 8 are held by wedges 16 which are hydraulically actuated. The Specification contains no discussion at all of the mounting of the cutter head on a rotary woodworking machine.

US 4533287 (Hagenmeyer), on the other hand, discloses the hydraulic clamping of a cutter head 10 on a spindle of a rotary woodworking machine but utilizes conventional screw-tightenable wedges 55 to retain the blades 50 in the cutterblock 21.

None of the above three Specifications addresses the problem of potential time saving by automating the procedures of blade clamping in a manner that allows the cutter head to be moved from a grinding machine to a woodworking machine with a minimum of realignment and time-consuming wedge tightening.

DISCLOSURE OF THE INVENTION

The invention provides a rotary cutter head for woodworking machinery, comprising a cutterblock body provided with clamping means for clamping the body on a spindle of a machine tool, and formed with a number of inwardly divergent recesses each receiving a cutter blade held therein by a wedge acted upon by hydraulically actuable means responsive to hydraulic pressure in a hydraulic fluid chamber in the body, CHARACTERISED IN THAT the clamping means for clamping the body on a spindle of a woodworking machine comprises a hydraulically actuable means which is also responsive to the hydraulic pressure in the hydraulic chamber so that pressurization of hydraulic fluid in the hydraulic chamber causes simultaneous clamping of the body on the spindle and the blades in the body; and the taper angle on the recesses and cooperating wedges is such as to provide a taper lock between the wedges and the cutterblock body so that depressurization of the hydraulic fluid in the hydraulic chamber causes unclamping of the body from the spindle without the simultaneous release of the blades from their recesses. Preferably each wedge is provided with at least one resilient means extending partially from a recess in the wedge to hold the cutter blade lightly in position on slackening of the wedge, as in European Patent No. 73595. The resilient means, on slackening of the wedges, serve lightly to hold the blades in position while the blades are initially set by hand.

The clamping means for clamping the cutterblock body on to a spindle of a machine tool comprises a hydraulically actuable clamp, known per se and comprising for example a resilient sleeve lining a central bore of the cutterblock body. When a hydraulic pressure is applied to a chamber formed between the central bore and the resilient sleeve, the sleeve contracts onto the spindle and both centres and clamps the cutterblock body onto the spindle. The advantage of using such a known clamping means in association with the cutter head of the invention is that the same hydraulic chamber can be used to provide hydrualic clamping pressure both to the resilient sleeve and the hydraulically actuable means for urging the wedges on to the blades.

In use, the cutter head of the invention is preferably first mounted on the driving spindle of a grinding machine, and the blades moved to approximately the same cutting diameter. This is particularly easy if the invention of our European Patent No. 73595 is utilized. Next, the hydraulic fluid, preferably grease, in the cutter head is pressurized. Typically this is achieved by applying a grease gun to a grease nipple on the cutter head, and using the grease gun as the source of hydraulic fluid under pressure. Alternatively the cutter head may be provided with a screw-actuated pressurization piston assembly in which a piston may be moved axially in a cylinder by means of a screwdriver, spanner or Allen key; and the hydraulic pressure of grease in the cutter head and in the cylinder may thus be increased or decreased. When the source of this hydraulic fluid under pressure is such a screw-actuated piston, the cutterblock is preferably still provided with a grease nipple and pressure relief valve for initial priming purposes, and if desired the grease nipple can be charged from a grease gum to achieve pressurization, notwithstanding the presence of the screw-actuated pressurization piston.

The above pressurization causes the cutter head to be centralized on and clamped to the spindle in known manner, but it also causes the wedges to be driven outwardly in their wedging recesses to clamp the blades firmly in position with a wedging action. At this stage the cutter head blades can be ground to a common diameter and profile, in known manner.

After grinding the blades, the hydraulic pressure in the cutter head can be released by means of a pressure relief screw or valve. This releases the cutter head from the spindle, in known manner. However, the clamping of the wedges is not released, since the angle of the wedge taper and recess taper is such that the wedges are frictionally locked against the recesses. The cutter block can therefore be removed from the grinding machine spindle and either stored ready for ultimate use on a woodworking machine or immediately mounted on a woodworking machine spindle and locked in position by again connecting to a grease gun as source of pressurized fluid to centre and clamp the cutter block on the spindle.

In a preferred aspect of the invention, the rear faces of the blades are axially serrated and cooperate with mating serrations in the cutterblock body or in a backing plate that is keyed to the cutterblock body, and, while the wedges are slackened, can be advanced incrementally therefrom.

In another preferred aspect of the invention a visual pressure gauge is provided on the cutter head, to serve as a visual indication of whether the hydraulic fluid in the cutter head is pressurized or not.

DRAWINGS

BEST MODE FOR CARRYING OUT THE INVENTION

Figure 1:
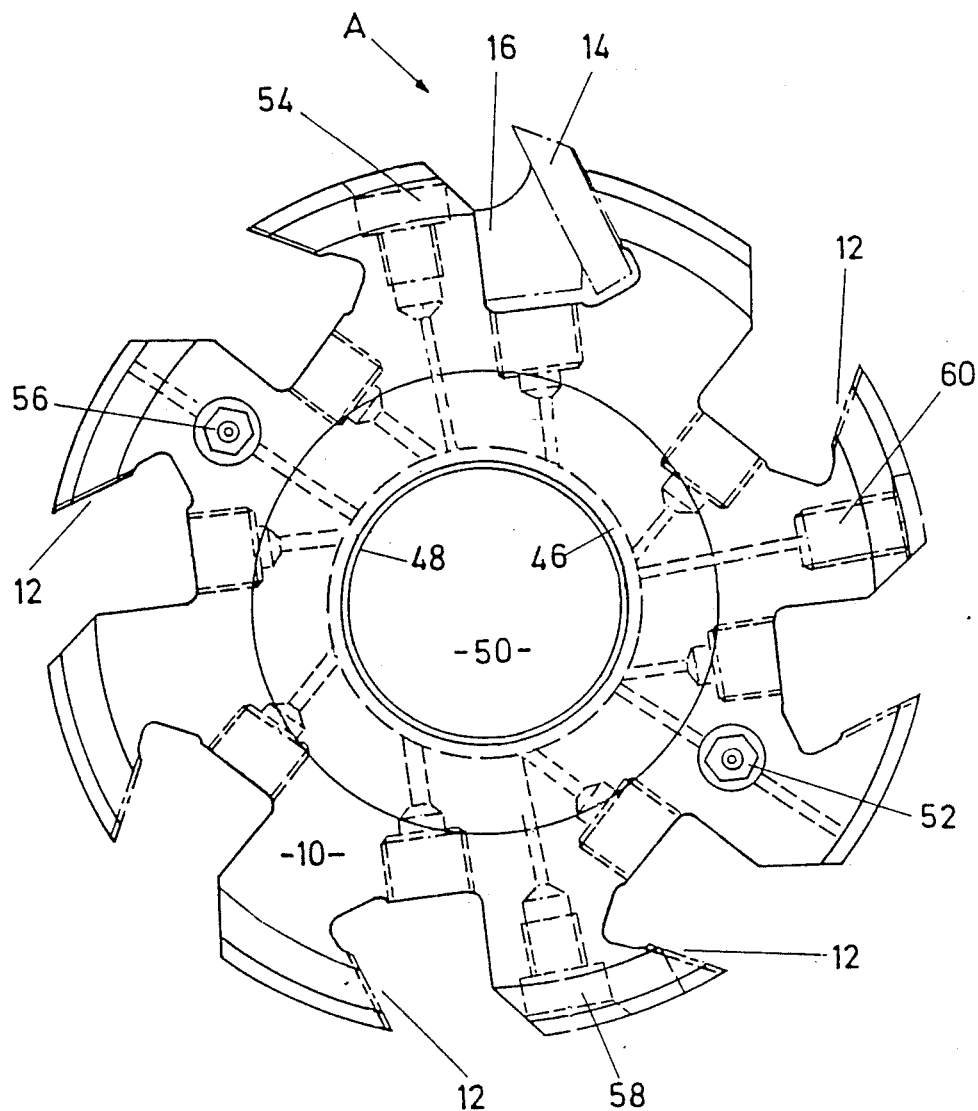
FIG. 1 is a side elevation of a rotary cutter head according to the invention.

FIG. 1 shows a rotary cutterblock 10 having eight blade-receiving recesses 12 equally spaced around its periphery. In one of these, labelled A, a blade assembly is clamped ready for use, whereas the others are shown schematically. In use all the recesses 12 would receive identical blade assemblies. The following description is of a cutter head containing eight such blade assemblies.

Figure 2:
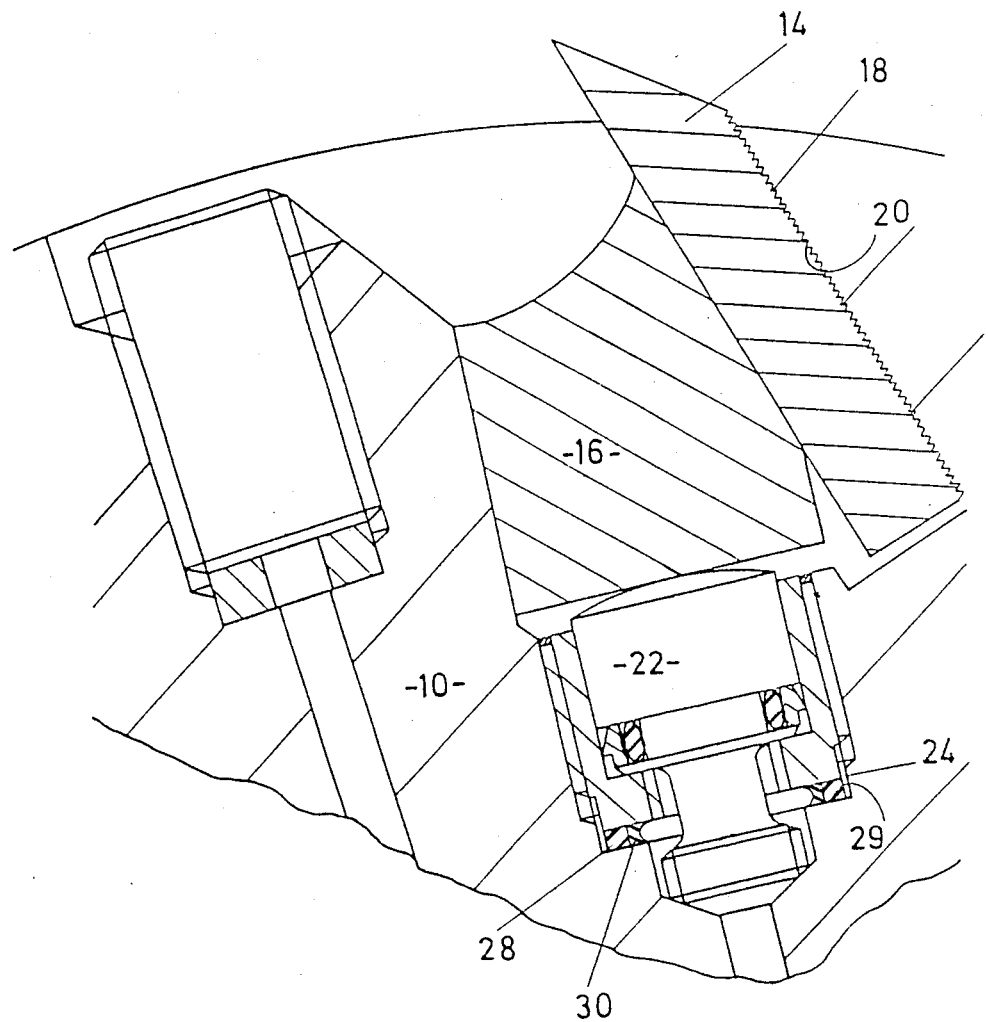
FIG. 2 is a section taken through one blade assembly and a visual pressure indicator of FIG. 1.

Each recess 12 is inwardly divergent, and each blade assembly contained therein comprises a blade 14 and a wedge 16. One such recess and blade assembly is shown in FIG. 2. The blade 14 has a serrated back 18, the serrations being in a direction parallel to the axis of the cutterblock. The serrations 18 mate with corresponding serrations 20 in the cutterblock body, to maintain axial alignment of the blade 14.

The wedge 16 has received therein a spring and ball bearing (not shown) which provide a light resilient bias against the blade 14 when the wedge 16 is slackened but which are received wholly within a recess in the wedge when the wedge is tightened against the blade as shown. Fuller details of the spring and ball bearing are as set out in our European Patent No. 73595, referred to above.

Located beneath the wedge 16 is an actuating plunger 22 axially movable in a sleeved bore 24 in the cutterblock 10, or a row of such plungers axially spaced along the recess 12. A sleeve 26 is screw threaded into each bore 24 until sealing members 28 and 30 abut a shoulder 29 formed in the bore. The sealing member 28 is a compressible metal alloy washer, such as sintered alloy washer, which conforms precisely to any surface irregularities of the shoulder against which it is compressed. The washer 28 after compression has a precisely predetermined thickness which sets a predetermined compression on the second sealing member 30 which is a rubber ring seal. The combination provides a high pressure seal which is highly resistant to the leakage of hydraulic fluid which in this preferred embodiment is a hydraulic grease.

Figure 3:
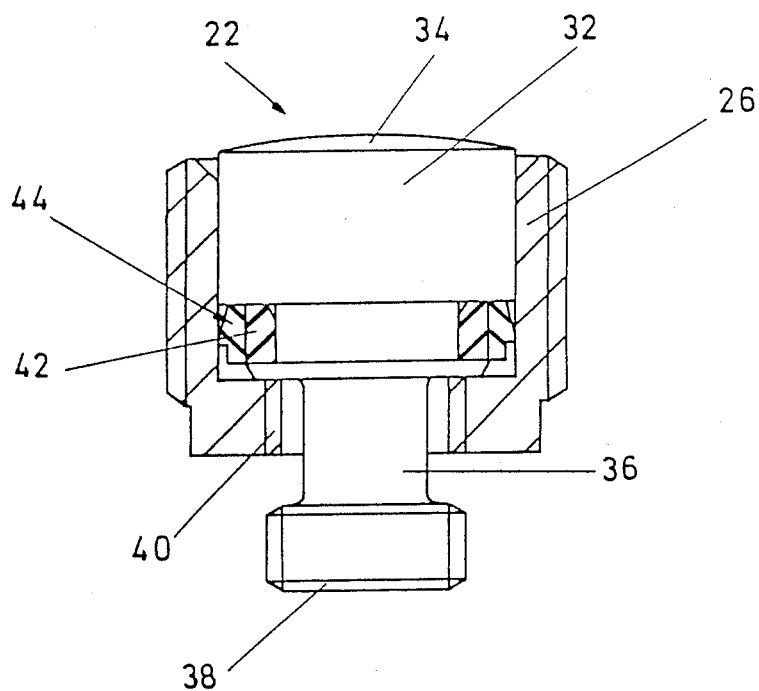
FIG. 3 is an axial section through the plunger and associated bore liner of FIG. 2.

One of the actuating plungers 22 is shown in greater detail in FIG. 3. The plunger 22 has a cylindrical body portion 32 with a domed head 34 and a narrow stem 36 leading to a screw-threaded tail 38. The diameter of the stem 36 is less than that of the tail 38, and the screw-thread of the tail cooperates with an internal screw-thread 40 in the sleeve 26 so that the plunger 22 can be brought into the operative position shown, relative to the sleeve, by threading the tail 38 completely through the sleeve 36. In that position the plunger 22 is axially movable relative to the sleeve 26 but held captive in the sleeve.

A seal assembly between the plunger 22 and the sleeve 26 comprises a rubber O-ring 42 surrounded by an anti-extrusion ring 44 made from a hard plastics material such as nylon.

The cylindrical body portion 32 of the plunger 22 is subjected to the hydraulic pressure in a grease chamber 46 (FIG. 1) which also supplies hydraulic pressure to a central flexible sleeve 48 running down the central axial bore 50 of the cutterblock 10. In use a grease gun can be applied to a grease nipple 52 or a grease nipple 54 on the cutterblock 10, and the pressure increased to cause simultaneous clamping of the cutter head on a shaft and actuation of all the plungers 22 to clamp the blades 14 in the recesses 12. This is one pressurization operation, as opposed to one pressurization and up to 48 screw tightening operations, each using a torque wrench, as in prior use cutter heads.

The grease nipples 52 and 54 may be located at any convenient positions around the cutterblock 10. Conveniently two nipples 52 are located one at each end of the cutterblock 10, so as to provide ease of access for a variety of woodworking machines on which the cutter head may be mounted. Also a plurality of nipples 54 may be provided, spaced axially along the cutterhead 10, so that the user may choose that most appropriate to the workstation at which the cutterblock is to be used. However many nipples 52 and 54 are used, pressurization at any single nipple has the result of locking the cutter block 10 onto the drive shaft and locking all the blades 14 in their recesses 12.

Release of the hydraulic pressure in the chamber 46 may be achieved by means of pressure release nipples 56 and 58, which may be provided in similar numbers and locations to the grease nipples 52 and 54, for access either axially or radially of the cutter head.

Shown very schematically in FIG. 1 is a pressure indicator 60 which provides a visual indication when the the grease in the hydraulic chamber 46 has been pressurized to a predetermined threshold pressure. One simple but effective form of such an indicator 60 could be a spring-loaded plunger which is advanced outwardly against the pressure of its spring until it is flush with the outer diameter of the cutterblock 10 when the predetermined pressure has been attained.

The use of the hydraulic cutter head of the invention is as follows. Initially the eight blades 14 are inserted in their recesses 12 and held therein by the wedges 16. This is facilitated by the resilient means (not shown) within the wedges 16. Then the cutterblock 10 is located on a spindle of a grinding machine (not shown) and a grease gun applied to any of the grease nipples 52 and 54. By means of the grease gun, the hydraulic pressure in the chamber 46 is raised to the predetermined level, which causes the simultaneous automatic centring and clamping of the cutter head on the spindle, and actuation of the hydraulic plungers 22 to clamp the blades 14 in their recesses 12.

The blades 14 can then be ground to a desired profile and cutting diameter on the grinding machine, following which release of the hydraulic pressure by means of any of the nipples 56 and 58 enables the cutter head to be removed from the grinding machine. The blades 14, however, remain locked in their recesses 12 because the taper angle of the recesses 12 and wedges 16 is such as to establish a frictional taper locking between the wedges 16, the blades 14 and the recesses 12. A separating tool, such as a hammer and bolster, would be needed to break that taper lock; and in the absence of such a separation the cutter block can be removed from the grinding machine, stored if necessary, and fitted to a spindle of a woodworking machine all without blade movement and without losing the accurate blade concentricity obtained during the grinding operation. When in position on the woodworking machine spindle, a repeat of the pressurization operation using the grease gun automatically centres and clamps the cutterblock ready for use. The pressure indicator 60 provides a visual indication to the operator that the cutterblock is in a pressurized condition and ready for use.

Advantages of the cutterblock illustrated in the drawings are as follows. Automatic centring of the block and clamping of the blades is rapid, avoiding the need for repeated screw adjustment operations each with its own inherent potential for operator error. The pressure imparted to the wedges 16 is uniform, so that no single wedge is either overtightened or undertightened. The risk of damage to the cutterblock 10 by overtightening is thereby avoided. A visual indication is provided that the cutterhead is ready for use. The need for angular spacing between adjacent blades to accommodate wedge-tightening screws or bolts is avoided, so that either the number of blades around a block can be increased or conversely, for a given number of blades the block diameter can be reduced.

We claim:

1. A rotary cutter head for woodworking machinery comprising:
    means defining a cutterblock body;
    a hydraulic chamber within said cutterblock body;
    first hydraulically actuable means for clamping said cutterblock body on a spindle of a woodworking machine in response to hydraulic pressure in said hydraulic chamber;
    a plurality of inwardly diverging recesses in said cutterblock body, each said recess being provided with:
        a cutter blade received substantially within but extending from the recess; and
        a wedge for retaining the cutter blade in the recess, said edge having a tapered lock angle and cooperating with the cutter blade and a wall which defines the recess; and
    second hydraulically actuable means responsive to hydraulic pressure in said hydraulic chamber for wedging said cutter blades in their respective recesses, said second hydraulically actuable means cooperating with said wedges, pressurization of hydraulic fluid in said hydraulic chamber causing simultaneous clamping of said cutterblock body on a spindle on which said cutterblock body is mounted and the wedging of said cutter blades, subsequent depressurization of the hydraulic fluid in said hydraulic chamber causing release of the clamping of the said cutterblock body on the spindle while said cutter blades remain wedges in their associated recesses by the taper lock action of said wedges.

2. The apparatus of claim 1 wherein said cutter blades have oppositely disposed front and rear faces and wherein the rear faces of said blades are axially serrated, said cutterblock body having walls which face said blade front and rear faces, said walls in part defining said recesses, the recess defining walls which face said blade rear faces, being provided with serrations, said serrations on said blades and walls cooperating to fix the position of said blades.

3. The apparatus of claim 1 wherein said second hydraulically actuable means comprises at least a first plunger associated with each of said wedges, said plungers being movable relative to said cutterblock body to extend into the wedgecontaining recesses in response to the pressurization of the hydraulic fluid in said chamber.

4. The apparatus of claim 2 wherein said second hydraulically actuable means comprises at least a first plunger associated with each of said wedges, said plungers being movable relative to said cutterblock body to extend into the wedgecontaining recesses in response to the pressurization of the hydraulic fluid in said chamber.

5. The apparatus of claim 4 wherein said cutterblock body is provided with sleeved bores extending between said hydraulic chamber and said recesses, said plungers being received in said bores.

6. The apparatus of claims 1, 2, 3, 4 or 5 further comprising:
    means for providing a visual indication of the hydraulic pressure which acts on said second hydraulically actuable means.

7. The apparatus of claims 1, 2, 3, 4, 5 or 6 further comprising:
 a source of pressurized hydraulic fluid, said source including a plurality of grease nipples distributed about the periphery of said cutterblock body, said nipples communicating with said hydraulic chamber, pressurization of any of said nipples causing pressurization of hydraulic fluid in said chamber.

8. The apparatus of claims 1, 2, 3, 4 or 5 further comprising:
 a source of pressurized hydraulic fluid for said chamber, said source comprising a screw-actuated pressurization piston assembly; and
 means for coupling said piston assembly to said chamber.

9. The apparatus of claim 1 further comprising:
 a source of pressurized hydraulic fluid for said chamber, said source comprising a screw-actuated pressurization piston assembly, and means for coupling said piston assembly to said chamber.

* * * * *